United States Patent
Yamane et al.

(10) Patent No.: US 9,758,077 B2
(45) Date of Patent: Sep. 12, 2017

(54) HEADREST

(71) Applicant: BIZEN HATSUJO CO., LTD., Okayama-shi (JP)

(72) Inventors: Takeshi Yamane, Okayama (JP); Tokuzo Kobayashi, Okayama (JP); Yasushi Taniguchi, Okayama (JP)

(73) Assignee: Bizen Hatsujo Co., Ltd., Okayama-shi ( * ) Notice: Subject to any disclaimer, the term of this patent is extended or adjusted under 35 U.S.C. 154(b) by 0 days.

(21) Appl. No.: 15/112,584

(22) PCT Filed: Feb. 28, 2014

(86) PCT No.: PCT/JP2014/055180
§ 371 (c)(1),
(2) Date: Jul. 19, 2016

(87) PCT Pub. No.: WO2015/129050
PCT Pub. Date: Sep. 3, 2015

(65) Prior Publication Data
US 2016/0355112 A1    Dec. 8, 2016

(51) Int. Cl.
*B60N 2/48* (2006.01)

(52) U.S. Cl.
CPC ........... *B60N 2/4885* (2013.01); *B60N 2/485* (2013.01); *B60N 2/4808* (2013.01); *B60N 2/4841* (2013.01); *B60N 2/4844* (2013.01)

(58) Field of Classification Search
CPC .. B60N 2/4885; B60N 2/4808; B60N 2/4841; B60N 2/4844; B60N 2/485
USPC ........................................................ 297/408
See application file for complete search history.

(56) References Cited

U.S. PATENT DOCUMENTS

| | | | |
|---|---|---|---|
| 8,382,206 B2 * | 2/2013 | Grable | B60N 2/4847 297/408 X |
| 2005/0156456 A1 | 7/2005 | Robinson et al. | |
| 2014/0210244 A1 * | 7/2014 | Tobata | B60N 2/4847 297/408 |

FOREIGN PATENT DOCUMENTS

| | | |
|---|---|---|
| JP | S60-036750 | 3/1985 |
| JP | S61-28452 | 2/1986 |
| JP | H03-064544 | 6/1991 |
| JP | H08-164035 A | 6/1996 |
| JP | 2000-342379 | 12/2000 |
| JP | 2006-523497 | 10/2006 |
| JP | 2009-213587 A | 9/2009 |
| JP | 2010-142439 | 7/2010 |

* cited by examiner

*Primary Examiner* — Anthony D Barfield
(74) *Attorney, Agent, or Firm* — Greer Burns & Crain Ltd.

(57) ABSTRACT

A headrest (1) includes a stay (6), a framework (2) supported by the stay (6) in a turnable manner toward a head of a sitting person, and supporting the head thereof, a shaft member (4) to be actuated in conjunction with the turning of the framework (2), and turning at a larger angle than a turning angle of the framework (2), and a coil spring (5) including a coil (50) wound around a pivot portion (47) of the shaft member (4) in a direction tightening the shaft member (4) when the framework (2) turns to the opposite side to the head side of the sitting person, and supports the head of the sitting person.

4 Claims, 6 Drawing Sheets

HEADREST

This is a National Phase Application filed under 35 U.S.C. §371, of International Application No. PCT/JP2014/055180, filed Feb. 28, 2014.

TECHNICAL FIELD

The present disclosure relates to a headrest.

BACKGROUND ART

Headrests are components which are attached to seats, such as a driver's seat of a vehicle and a passenger's seat thereof, and which support the head of a sitting person. Some headrests include a framework to which a cushioning member is attached, and a stay that supports the framework, and allows the position adjustment of the framework in the back-and-forth direction in accordance with the posture of the sitting person and the body type thereof. Such headrests are provided with a mechanism that prevents the framework from moving backwardly so as not to allow the head to move backwardly due to shock from a collision.

For example, Patent Literatures 1-4 disclose headrests that include a stay, a link member coupled to the stay in a turnable manner, a framework coupled to the link member in a turnable manner, and a ratchet member that is capable of restricting the turning of the link member. Those headrests allow the position adjustment of the framework in the back-and-forth direction by the turning link member. In addition, the ratchet member prevents the framework from moving backwardly.

Patent Literature 5 discloses a headrest that includes a framework turnable in the back-and-forth direction, a stay that turns relative to the framework, and a coil spring attached so as to tighten the stay. The coil spring is wound in such a way that the direction in which the stay relatively turns when the framework turns backwardly is the direction in which the number of windings of the coil spring increases, and has one end stationary fixed to the framework. According to this headrest, when the framework is pushed forwardly, the framework turns together with the end of the coil spring, the winding of the coil is loosened, and thus the tightening force for the stay by the coil spring decreases. Hence, the framework can be pushed forwardly, and the position thereof can be adjusted in a stepless manner. Conversely, when the framework is pushed backwardly, the end of the coil spring turns in a direction in which the windings of the coil increases, the coil spring tightens the turning stay relative to the framework, and thus the backward movement of the framework is restricted.

CITATION LIST

Patent Literature

Patent Literature 1: Unexamined Japanese Utility Model Application Kokai Publication No. S60-036750
Patent Literature 2: Unexamined Japanese Utility Model Application Kokai Publication No. H03-064544
Patent Literature 3: Unexamined Japanese Patent Application Kokai Publication No. 2000-342379
Patent Literature 4: National Patent Publication No. 2006-523497
Patent Literature 5: Unexamined Japanese Patent Application Kokai Publication No. 2010-142439

SUMMARY OF INVENTION

Technical Problem

In order to protect the head of a sitting person, a headrest is desired which absorbs shock from a collision, and which minimizes the movement of the head due to the shock as much as possible. In order to do so, a headrest is desirable that enables a precise adjustment of the position of the headrest so as not to have a space between the head of the sitting person and the headrest. According to the headrests disclosed in Patent Literatures 1-4, however, the position relative to the head of the sitting person is adjusted by the ratchet member. Hence, according to those headrests, a precise adjustment of the position of the framework is difficult. In addition, according to those headrests, since the ratchet member is formed of metal, when shock that moves the framework backwardly is applied, this shock cannot be fully absorbed. Still further, according to the headrest disclosed in Patent Literature 5, the coil spring tightens the stay to restrict the backward movement of the framework, thereby positioning the stay at the desired position. However, a positional misalignment (for example, a play originating from untightening or tightening by the coil spring) occurs between the coil spring and the stay, and thus the coil spring slightly moves in the circumferential direction of the stay. Hence, according to this headrest, a precise position adjustment for the distance between the framework and the head of the sitting person is difficult.

The present disclosure has been made in view of the foregoing circumstances, and an objective of the present disclosure is to provide a headrest which is capable of precisely adjusting the relative position of a framework to the head of a sitting person in a stepless manner, and which is also capable of absorbing shock when the shock that moves the framework backwardly is applied.

Solution to Problem

A headrest according to the present disclosure supports a head of a sitting person, and includes:
a stay;
a framework supported by the stay in a turnable manner toward the head of the sitting person, and supporting the head of the sitting person;
a shaft member to be actuated in conjunction with a turning of the framework, and turning at a larger angle than a turning angle of the framework; and
a coil spring including a coil that is wound around the shaft member in a direction tightening the shaft member when the framework turns to an opposite side to the head side of the sitting person, having one end of the coil stationary fixed to the framework, decreasing the tightening of the shaft member when the framework turns toward the head side of the sitting person, and restricting the turning of the framework by tightening the shaft member to restrict the turning thereof when the framework turns to the opposite side to the head side of the sitting person.

The shaft member may turn in an opposite direction to the turning of the framework.

The framework may be formed in a shape including a hollow and a through hole which reaches the hollow from an outer circumference surface of the framework, and in which the stay is inserted; and the framework may include an internal wall portion of the through hole that abuts on the stay, and is turnable toward the head of the sitting person around the internal wall portion.

The headrest may further include:

first and second cam portions provided at the shaft member, turnable together with the shaft member, and capable of abutting an other end of the coil; and a catch portion provided on the framework and capable of catching the other end of the coil, in which:

the first cam portion abuts to the other end of the coil, and causes the other end of the coil to be caught by the catch portion when the framework turns toward the head of the sitting person, and the framework turns up to a certain position in the direction toward the head of the sitting person; and the second cam portion abuts to the other end of the coil, and releases the other end of the coil from the catch portion when the framework turns in the opposite direction to the head of the sitting person and the framework turns up to the certain position.

The stay may include two pillar bodies that extend downwardly relative to the framework, and a coupling member that couples the two pillar bodies at the upper sides thereof;

the framework may be turnable toward the head of the sitting person around a lower portion of the stay; and the shaft member may be positioned between the coupling member and a center of the turn.

The other end of the coil may include a bent portion.

Advantageous Effects of Invention

The headrest according to the present disclosure is capable of precisely adjusting the relative position of the framework to the head of the sitting person in a stepless manner, and is also capable of absorbing shock when the shock that moves the framework backwardly is applied.

BRIEF DESCRIPTION OF DRAWINGS

FIGS. 3A and 3B are each a cross-sectional view of the headrest in a condition in which a sealing member and a cushioning member are attached, and FIG. 3A is a cross-sectional view taken along a line A-A in FIG. 1A, while

DESCRIPTION OF EMBODIMENTS

An explanation will be given below in detail of a headrest 1 according to an embodiment of the present disclosure with reference to the figures. In the figures, the same or equivalent portions will be denoted by the same reference numeral. As for the coordinate in the figures, a coordinate system is set in which the back-and-forth direction when the headrest 1 is viewed from a sitting person side on a seat is a B-direction, the horizontal direction is a W-direction, and the vertical direction is a H-direction.

First Embodiment

The headrest 1 according to a first embodiment is a vehicular headrest that is capable of turning a framework 2 toward a head side of a sitting person and is capable of adjusting a distance between the head and the framework 2. As illustrated in FIGS. 1A-2B, the headrest 1 includes a stay 6, the framework 2 and a bracket 3 that are turnable relative to the stay 6, a shaft member 4 that turns in conjunction with the turning of the framework 2, and a coil spring 5 that restricts the turning of the shaft member 4. The coil spring 5 includes a coil 50, a free end 51, and a fixed end 52.

As illustrated in FIGS. 2A-3B, the stay 6 is formed by a pipe bent in a reversed U shape. The stay 6 includes a pair of second pillar portions 62 (pillar bodies), and a first pillar portion 61 (coupling portion) that couples the respective upper ends of the second pillar portions 62. The second pillar portion 62 is a portion inserted in an attachment hole of a seat 100 when the headrest 1 is in use, and the first pillar portion 61 is a portion that supports the framework 2.

The framework 2 is formed in a hollow box shape, and the external surface of the framework 2 is covered by a cushioning member 8 formed of a foamed resin or the like. Openings 27 are formed in the bottom surface of the framework 2 and the second pillar portions 62 of the stay 6 are inserted therein loosely. An upper end portion of the second pillar portion 62 of the stay 6 above a bent portion 65, and the first pillar portion 61 are housed in the framework 2, and those portions of the stay 6 are not directly stationary fixed to the interior of the framework 2. The framework 2 is capable of turning (moving, swinging) around the opening 27 relative to the stay 6. More specifically, the framework 2 includes a framework front portion 22 formed with a plurality of ribs 25 that guides the stay 6, a framework rear portion 21 that covers the ribs 25, and the bracket 3 embedded in the framework 2.

The plurality of ribs 25 of the framework front portion 22 is each formed as a groove extending in the vertical direction. This groove restricts the movement of the second pillar portion 62 of the stay 6 in the horizontal direction, but guides the second pillar portion 62 in the back-and-forth direction. This groove has a width substantially the same as the diameter of the second pillar portion 62 of the stay 6, and has a larger depth than a turning distance of the framework 2 relative to the stay 6, that is, an operation range enabling the sitting person to move and operate the framework 2.

The framework front portion 22 includes a tabular front surface which supports the head of the sitting person and which receives the load of the head and shock. The framework front portion 22 is formed of polypropylene (PP), polyethylene (PE), or the like, and is capable of withstanding against a load of, for example, 1000 N. An unillustrated receptacle for the stay 6 is provided on the internal wall of the framework front portion 22. The receptacle for the stay 6 catches the stay 6 when the stay 6 is in an initial condition to be explained later, and supports an abnormal load when such an abnormal load is applied to the framework front portion 22. In addition, when the bracket 3 and the framework 2 are separate components, the framework front portion 22 includes a support portion 26 which couples them, and which is formed at the back surface side.

The framework rear portion 21 includes a tabular surface that covers the grooves formed by the ribs 25 from the back surface side, and restricts the backward movement of the stay 6. This tabular surface protects the interior of the framework 2, receiving shock from the back surface side. The framework rear portion 21 is formed of, for example, polypropylene, polyethylene so as not to be damaged when, for example, the vehicle collides and the sitting person on the rear seat hits the framework 2.

Figure 1A:
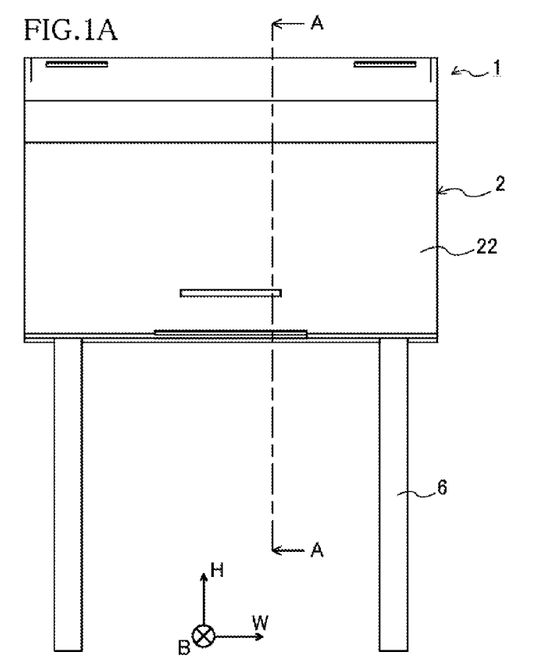
FIG. 1A is a front view illustrating a headrest according to a first embodiment of the present disclosure.
Figure 1B:
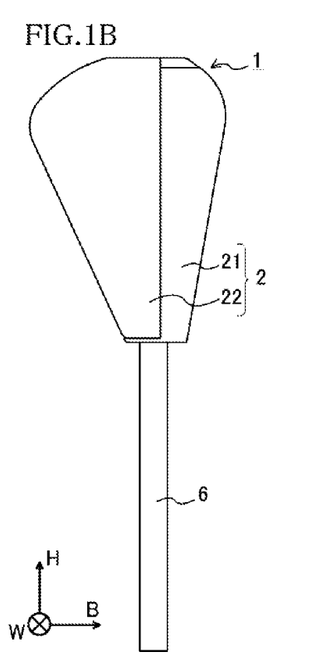
FIG. 1B is a side view.
Figures 1C, 1D:
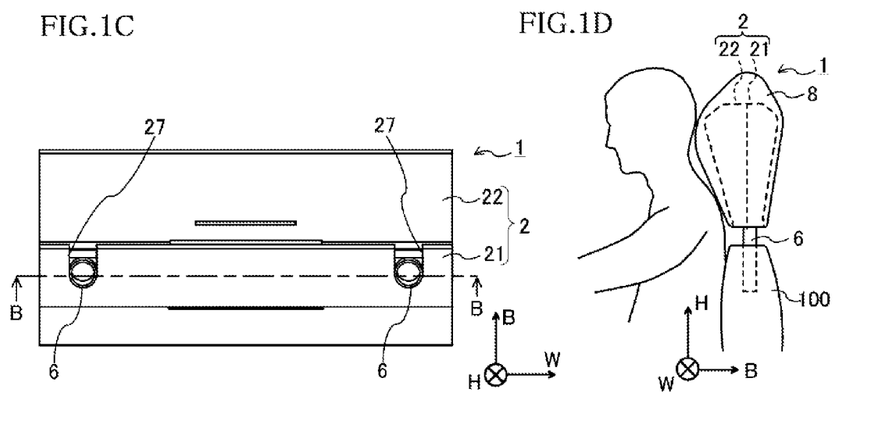
FIG. 1C is a bottom view.
FIG. 1D is a side view when the headrest is in use.

As illustrated in FIG. 1C, the framework rear portion 21 is provided with grooves which are formed in the bottom surface, and which form the respective openings 27 together with the end face of the framework front portion 22 at the bottom-surface side. A sealing member 7 formed of a foamed resin or the like is provided in the opening 27. The sealing member 7 seals the opening 27 so as to suppress a leakage of a material (for example, urethane foam solution) of the cushioning member 8 in the framework 2 when the material of the cushioning member 8 is filled and attached. The groove of the opening 27 may be formed in the framework front portion 22, and may be formed in both the framework front portion 22 and the framework rear portion 21. The combined framework front portion 22 and framework rear portion 21 may form the opening 27.

The bracket 3 is a member which is provided inside the framework 2, and which has a guiding function of directing the turning of the framework 2 toward the head of the sitting person. As illustrated in FIGS. 2A-3B, the bracket 3 includes a plate portion 35, a spring catch portion 37 that catches the fixed end 52 of the coil spring 5, a catch portion 31 with which the free end 51 of the coil spring 5 is catchable, and an auxiliary cam portion 32 that assists the catching action of the free end 51 of the coil spring 5 by the catch portion 31.

Figure 3A:
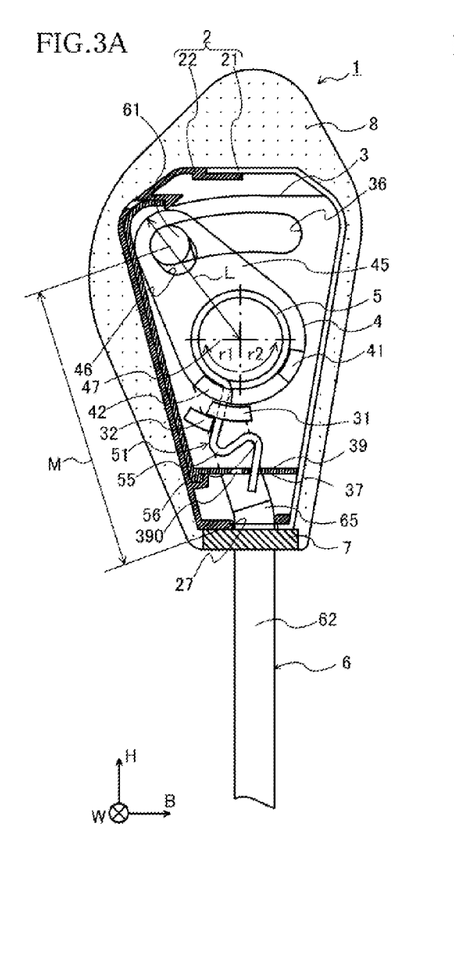

As illustrated in FIG. 3A, the plate portion 35 is formed in a substantially same shape as the internal cross-sectional shape of the framework 2 in the back-and-forth direction, and is fitted in the framework 2 in parallel with such a cross-section, thereby being integrated with the framework 2. The plate portion 35 is supported by the support portion 26 of the framework front portion 22. The plate portion 35 is formed with a through hole 38 in which a front end portion 48 of the shaft member 4 is inserted in a turnable manner, a spring insertion hole 34 where the fixed end 52 of the coil spring 5 is inserted and stationary fixed, and a first stay insertion groove 36 in which the first pillar portion 61 of the stay 6 is inserted.

As illustrated in FIG. 3A, the first stay insertion groove 36 is a circular-arc groove that has both ends extending in the back-and-forth direction. The length of the circular arc defines the operation range of the framework, and is set to, for example, 30-40 mm. The center of the circular arc is located near the opening 27 of the framework rear portion 21. The first stay insertion groove 36 has a slightly wider groove width than the diameter of the stay 6, and the first stay insertion groove 36 functions as a guide for the turning framework 2 relative to the stay 6. In order to reduce the wear-out of the internal wall of the first stay insertion groove 36, preferably, the plate portion 35 is formed of a material with a hardness (for example, polyoxymethylene).

Spring insertion grooves 39 and 390 are formed in the spring catch portion 37. The free end 51 of the coil spring 5 is loosely inserted in the spring insertion groove 39. Hence, the tightening force by the coil spring 5 is adjusted. The spring insertion groove 390 is a groove where the free end 51 can be losely inserted. When the coil spring 5 excessively tightens a pivot portion 47, instead of (as a backup) the spring insertion groove 39, the free end 51 is inserted and utilized.

The catch portion 31 and the auxiliary cam portion 32 is an operation mechanism that operates the catching action of the free end 51 of the coil spring 5 together with a first cam portion 41 and a second cam portion 42 both to be explained later. As illustrated in FIG. 3A, the catch portion 31 and the auxiliary cam portion 32 are disposed side by side at the nearby location to the outer circumference of the coil spring 5 where the free end 51 of the coil spring 5 is positioned. The catch portion 31 is formed as a groove in the side wall of the rib that has a circular arc cross-section, and catches the free end 51 when the coil spring 5 is untightened. The auxiliary cam portion 32 is formed on the end face of the rib that has the circular arc cross-section, and includes an inclined surface inclined toward the side wall of the groove of the catch portion 31. The auxiliary cam portion 32 assists the catching action of the free end 51 of the coil spring 5 to the catch portion 31 through such the inclined surface.

Figure 2A:
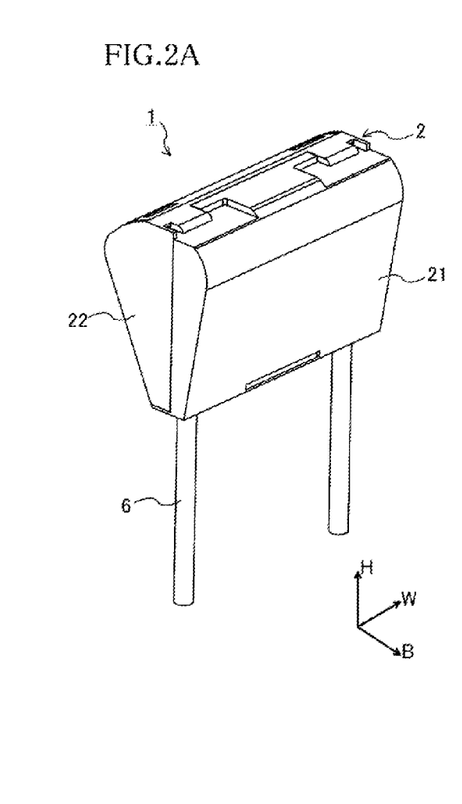
FIG. 2A is a perspective view of the headrest.
Figure 2B:
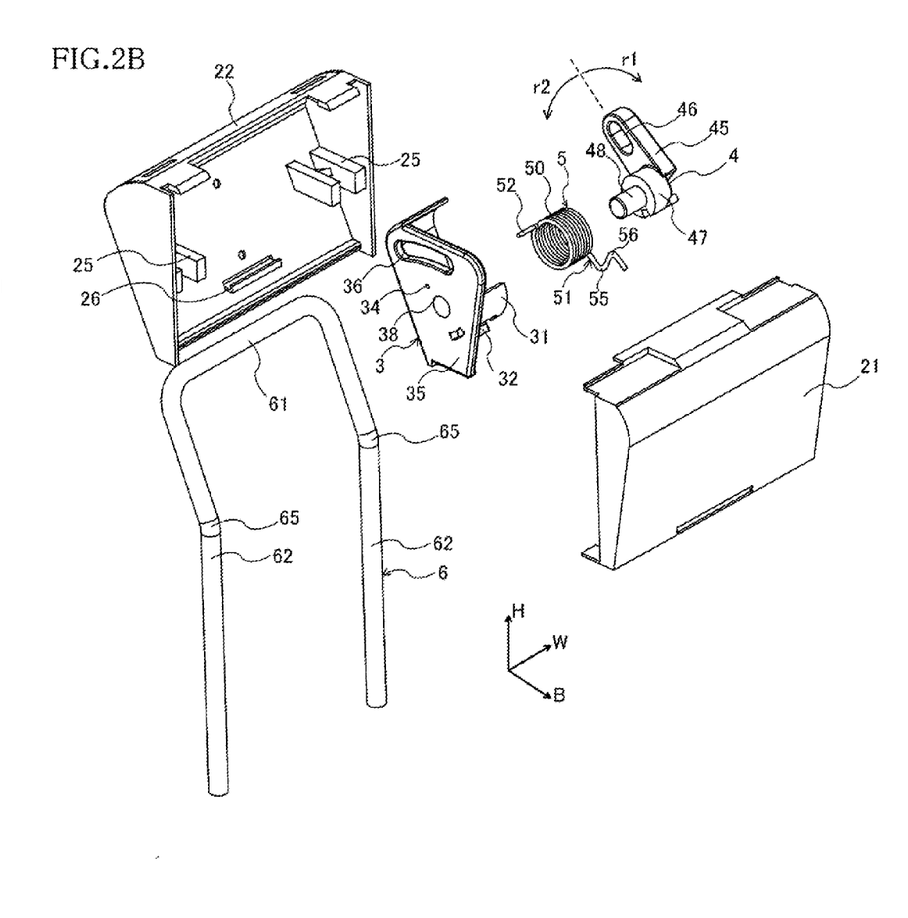
FIG. 2B is an exploded perspective view thereof.

The shaft member 4 is a member that converts the turning of the framework 2 into a turning that has a larger turning angle. As illustrated in FIG. 2B, the shaft member 4 includes an arm portion 45, the pivot portion 47, the first cam portion 41, and the second cam portion 42. The shaft member 4 constructs a spring brake mechanism together with the coil spring 5 to be explained later, and this spring brake mechanism is operated by the operation mechanism including the first cam portion 41, the second cam portion 42, and the like.

As illustrated in FIG. 2B and FIG. 3A, the arm portion 45 extends from the center of the pivot portion 47 toward the first pillar portion 61 of the stay 6. The arm portion 45 is formed with a second stay insertion groove 46 in a substantially elliptical shape, and the first pillar portion 61 of the stay 6 is inserted in the second stay insertion groove 46. Hence, an interference among the second stay insertion groove 46, the first stay insertion groove 36 of the bracket 3, and the stay 6 with each other is prevented, enabling the shaft member 4 and the bracket 3 to actuate in conjunction with each other. The arm portion 45 turns by the turning of the bracket 3. Note that the second stay insertion groove 46 is formed in a shape in accordance with the shape of the first stay insertion hole 36. For example, the second stay insertion groove 46 may be formed in a circular hole or groove in addition to a substantially elliptical shape.

The arm portion 45 has a length L that is shorter than a distance M from the opening 27 of the framework 2 to the first pillar portion 61. The ratio L/M makes the turning angle of the arm portion 45 larger than the turning angle of the bracket 3 and that of the framework 2. Preferably, the turning angle is set to be twice to three times as much as the turning angle of the framework 2, and when, for example, the turning angle of the framework 2 is 20-30 degrees, preferably, substantially 60 degrees.

Figure 3B:
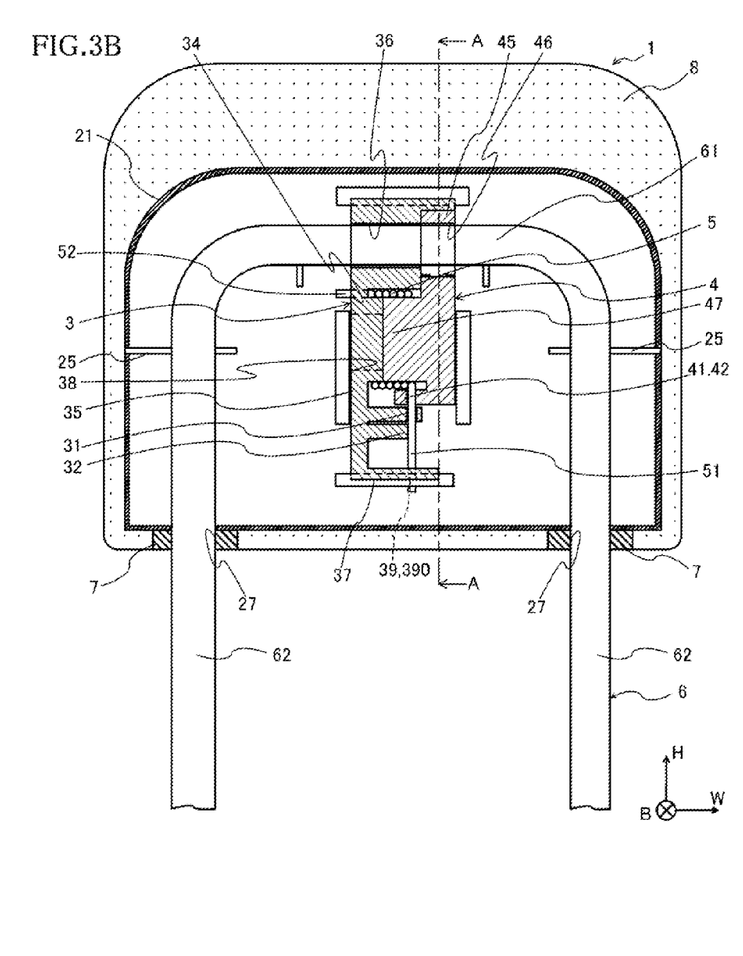
FIG. 3B is a cross-sectional view taken along a line B-B in FIG. 1C.

As illustrated in FIGS. 3A and 3B, the pivot portion 47 is formed in a cylindrical shape and extends in the horizontal direction, and the tightened coil spring 5 is wound around the outer circumference of the pivot portion 47. The pivot portion 47 is formed with the front end portion 48 inserted in the through hole 38 of the bracket 3, and is coupled to the bracket 3 in a turnable manner. A cylindrical portion where the first cam portion 41 and the second cam portion 42 formed by uneven surfaces are disposed side by side in a line is provided at the outer circumference end portion of the pivot portion 47. In order to reduce the wear-out of the first cam portion 41, second cam portion 42, and pivot portion 47, preferably, the pivot portion 47 is formed of a hard material (for example, polyoxymethylene or metal).

The first cam portion 41 and the second cam portion 42 are each a cam mechanism which turns together with the pivot portion 47, abuts the free end 51 of the coil spring 5, and catches the free end 51 to the catch portion 31 of the bracket 3 or releases the free end 51 therefrom. When the free end 51 of the coil spring 5 is located between the first cam portion 41 and the second cam portion 42, the free end 51 is not caught by the catch portion 31. Hence, a gap between the first cam portion 41 and the second cam portion 42 defines an adjustment range that enables an adjustment of the distance between the head of the sitting person and the framework 2. This gap is designed so as to be slightly narrower than the operation range of the framework 2.

When the pivot portion 47 turns in a direction that turns back the winding of the coil 50, the first cam portion 41 has a wall surface that abuts the free end 51 of the coil spring 5 in the direction in which the coil spring 5 is turned back. More specifically, when the framework 2 is turned forwardly and reaches an end of the adjustment range, the first cam portion 41 abuts the free end 51 of the coil spring 5.

The second cam portion 42 is formed in a shape that has an inclined surface inclined relative to the side wall surface of the catch portion 31, and when the framework 2 is turned backwardly and reaches an other end of the adjustment range, abuts the free end 51 of the coil spring 5.

The coil spring 5 is wound around the pivot portion 47 of the shaft member 4, and has the fixed end 52 stationary fixed to the bracket 3. The coil spring 5 is wound in a direction tightening the pivot portion 47 when the framework 2 is turned to the opposite side to the head of the sitting person. As for the coil spring 5, the internal diameter of the coil 50 in a free condition is slightly smaller than the outer diameter of the pivot portion 47. When, for example, the diameter of the winding is 2.6 mm, the number of windings is four, and the pivot portion 47 has a diameter of 30 mm, the internal diameter of the coil 50 is smaller than that of the pivot portion 47 by 2-4%. Hence, the coil spring 5 restricts the turning of the shaft member 4. More specifically, the coil spring 5 functions as a spring brake (also called a spring lock, a shaft lock, a spring clutch, and the like) between the bracket 3 and the shaft member 4. When the coil 50 of the coil spring 5 turns in a direction tightening the pivot portion 47, the turning of the shaft member 4 relative to the bracket 3 is restricted by the spring brake accomplished by the coil spring 5. The coil spring 5 locks the turning of the shaft member 4 relative to the bracket 3 when slight load is applied to the framework 2, and turns while slipping when excessive load (for example, a collision of the vehicle) is applied to the framework 2, thereby functioning as a damper (that absorbs shock). In addition, when turning in the opposite direction to the direction tightening the pivot portion 47, the coil spring 5 is untightened, thereby decreasing the restriction for the turning of the shaft member 4 relative to the bracket 3. A lubricant is applied to the coil spring 5 in order to facilitate the turn-in and turn-out of the winding. The turn-in and turn-out of the winding is adjusted based on, in addition to the kind of lubricant, the number of windings of the coil 50, the interference, the surface roughness, and the like.

The coil spring 5 includes the fixed end 52 that is one end of the coil 50 formed and bent outwardly, and the free end 51 that is the other end of the coil 50 formed and bent outwardly. The fixed end 52 is stationary fixed to the bracket 3, while the free end 51 includes a straight portion that is capable of abutting the first cam portion 41 and the second cam portion 42, and bent portions 55 and 56. The bent portions 55 and 56 form the free end 51 in an S shape as a whole. This S shape is a shape that can still function as a free end even if a tip of the free end 51 is caught, and for example, the length is substantially equal to or greater than 10 times as long as the diameter of the winding. By the free end 51 that has the bent portions 55 and 56, the magnitude of the tightening torque by the coil spring 5 (torque when the pivot portion 47 does not turn), and that of the locking torque (torque to lock the turning when the pivot portion 47 turns) can be adjusted.

Action of First Embodiment

Figure 4A:
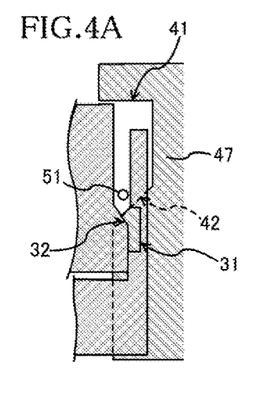
FIGS. 4A-4E are diagrams for explaining actions of pivot portion, catch portion, auxiliary cam portion, first cam portion, and second cam portion of a shaft member.
Figure 4B:
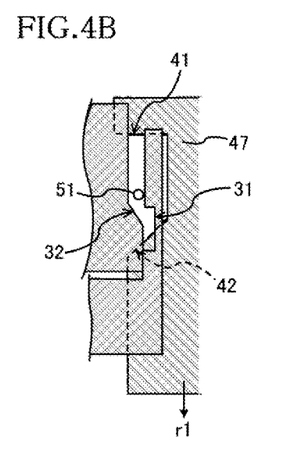
Figure 5A:
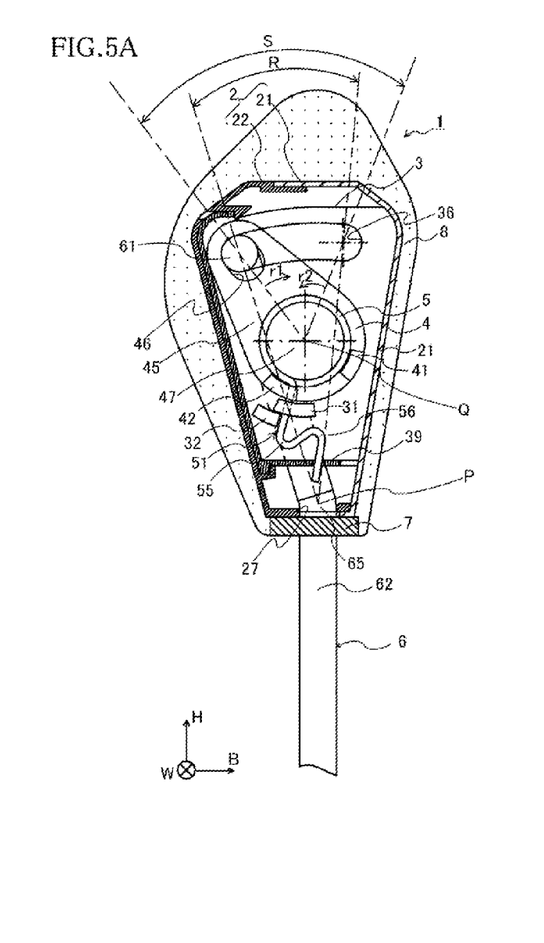
FIG. 5A is a cross-sectional view illustrating the headrest in a retracted condition (initial condition)

The headrest 1 illustrated in FIG. 5A has the framework 2 standing upright. The free end 51 of the coil spring 5 is released from the wall surface of the groove in the catch portion 31 (see FIG. 4A) (this condition will be referred to as an initial condition). When the framework 2 is pushed forwardly, the framework 2 turns around a center P. With the stay 6 being inserted in the attachment holes of the seat 100, the first pillar portion 61 of the stay 6 is inserted in the first stay insertion groove 36 of the plate portion 35 of the bracket 3 and in the second stay insertion groove 46 of the shaft member 4, and thus the pivot portion 47 of the shaft member 4 turns in the direction of an arrow r1 (opposite direction to the framework 2) around a center Q. At this time, the coil 50 of the coil spring 5 turns in an untightening direction (turn-back direction), and is untightened until the pivot portion 47 becomes freely turnable relative to the coil spring 5. Hence, according to this headrest 1, the framework 2 is pushed forwardly, is moved to a desired position, and thus the position of the framework 2 can be adjusted.

Conversely, when the framework 2 is moved forwardly, and the framework 2 is within the adjustment range, and when force directed backwardly is applied to the framework 2, torque around a center P located at the opening 27 is applied to the framework 2. Hence, torque that turns in the direction of an arrow r2 around the center Q is applied to the pivot portion 47 of the shaft member 4. Since the coil spring 5 has the fixed end 52 that is stationary fixed to the bracket 3, turning torque in the direction of the arrow r2 (turn-in direction) is applied to the coil spring 5, the coil spring 5 further tightens the pivot portion 47, and thus frictional force further increases. The spring brake acts between the coil spring 5 and the pivot portion 47.

When the framework 2 is within the adjustment range, and when shock (for example, a collision of the vehicle) with a certain value (for example, 500-1000 N) is applied to the framework 2 from the forward direction, the coil spring 5 slips over the surface of the pivot portion 47 of the shaft member 4, thereby absorbing the energy of the shock. Accordingly, the headrest 1 protects the head of the sitting person. The load that causes the coil spring 5 to slip is 500-1000 N or so, and is set as appropriate in accordance with the vehicle type to which the headrest 1 is applied, and the use condition.

Figure 5B:
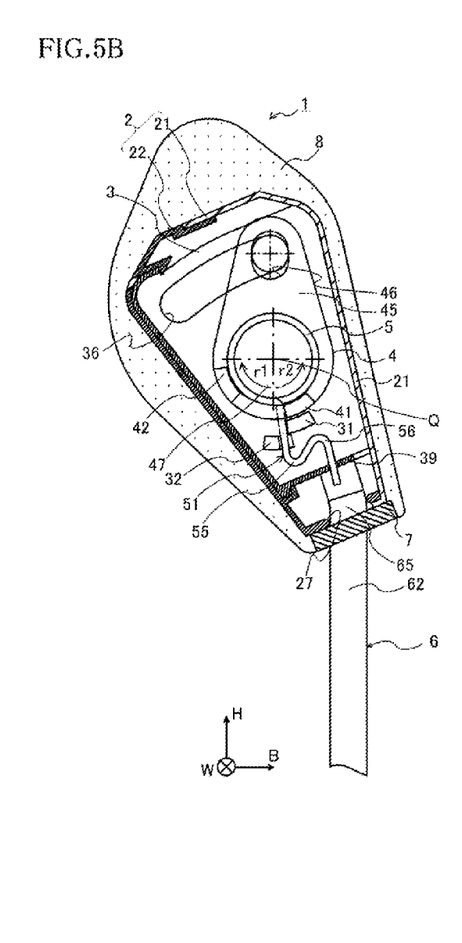
FIG. 5B is a cross-sectional view illustrating the headrest in a forwarded condition.

As for the procedure of returning the headrest 1 from the use position to the initial condition, first, the framework 2 is pushed forwardly, and the framework 2 is moved to the foremost position illustrated in FIG. 5B.

Figure 4C:
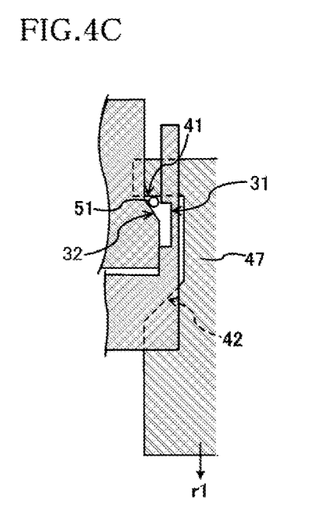
Figure 4D:
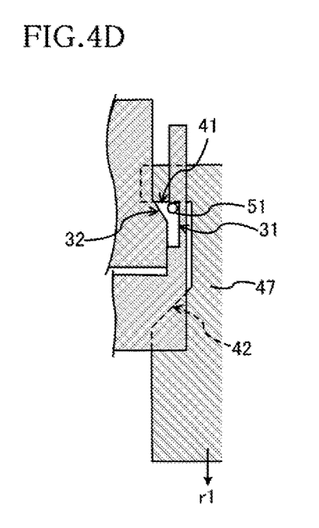

When the framework 2 is moved forwardly, the pivot portion 47 of the shaft member 4 turns together with the second cam portion 42. After the framework 2 goes out from the adjustment range, the second cam portion 42 of the shaft member 4 pushes the free end 51 of the coil spring 5 until reaching the limit (foremost position) of the adjustment range, and the coil spring 5 is turned back (see FIG. 4C). At this time, the free end 51 of the coil spring 5 moves along the inclined surface of the auxiliary cam portion 32, and is pushed up toward the catch portion 31. The catch portion 31 catches the free end 51 of the coil spring 5 (see FIG. 4D). The pivot portion 47 of the shaft member 4 becomes a freely turnable condition in the back-and-forth direction, and thus the free turning in the back-and-forth direction is ensured for the framework 2.

Figure 4E:
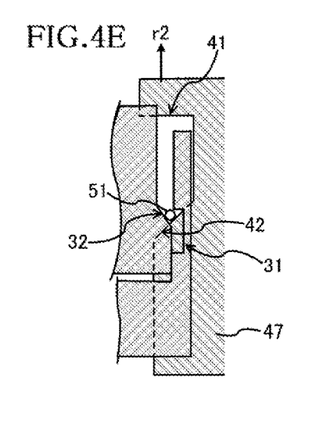

Next, the framework 2 is pushed backwardly, and the framework 2 is moved from the position illustrated in FIG. 5B to the position illustrated in FIG. 5A. The first stay insertion groove 36 is shifted forwardly, and the arm portion 45 of the shaft member 4 and the pivot portion 47 thereof turn in the direction of the arrow r2 around the center Q. The turning shaft member 4 causes the second cam portion 42 of the shaft member 4 to turn in the direction of the arrow r2. When the framework 2 is moved to the position illustrated in FIG. 5A, the second cam portion 42 abuts the free end 51 of the coil spring 5, and this free end 51 moves along the inclined surface of the second cam portion 42 (see FIG. 4E). The free end 51 of the coil spring 5 is released from the wall surface of the groove of the catch portion 31 (see FIG. 4A), and the coil 50 of the coil spring 5 returns to the initial condition of tightening the pivot portion 47. Hence, the positional adjustment between the framework 2 and the head is enabled.

As explained above, the headrest 1 of the first embodiment includes the stay 6, the framework 2 and the bracket 3 both turnable relative to the stay 6, the shaft member 4 turnable at a larger turning angle than the turning angle of the framework 2 in conjunction with the framework 2, and the coil spring 5 wound around the pivot portion 47. The bracket 3, the shaft member 4, and the coil spring 5 construct the spring brake mechanism. The bracket 3 guides the turning of the framework 2 through the first stay insertion groove 36. According to the headrest 1, when the framework 2 turns, the angular change of the framework 2 is transmitted to the pivot portion 47 of the shaft member 4 as a larger angular change. By increasing the turning angle of the shaft member 4 relative to the turning of the framework 2, an effect originating from the positional misalignment (for example, play and displacement) between the coil spring 5 and the shaft member 4 can be remarkably reduced. When, for example, the turning angle of the shaft member 4 is three times as much as the turning angle of the framework 2, the magnitude of the positional misalignment of the framework 2 is ⅓. In the adjustment of the framework 2 to the position in the back-and-forth direction, the position can be also adjustable at the precision of such a ratio.

The coil spring 5 of the headrest 1 includes the coil 50 wound in the direction of tightening the pivot portion 47 when force that turns the framework 2 backwardly is applied, the fixed end 52 fitted in the spring insertion hole 34 of the bracket 3, and the free end 51 that is freely movable relative to the bracket 3. According to the headrest 1, when force that turns the framework 2 backwardly is applied, the coil spring 5 restricts this turning. Conversely, when the framework 2 turns forwardly, the coil spring 5 does not restrict the turning of the framework 2. Hence, according to the headrest 1, the framework 2 can be freely turned in the forward direction, and thus the distance between the head of the sitting person and the framework 2 can be precisely adjusted in a stepless manner. After the adjustment, although the sitting person puts his/her head on the headrest 1, the position of the framework 2 can be maintained at the adjusted position.

According to the headrest 1, when force like a shock that has equal to or greater than a certain value is applied to the framework 2 from the forward direction, the coil spring 5 slips over the pivot portion 47 of the shaft member 4. Hence, the headrest 1 absorbs the energy of the shock or the like from the forward direction, thereby protecting the head of the sitting person.

The headrest 1 includes the catch portion 31 formed at the bracket 3, the auxiliary cam portion 32 that assists the catching of the free end 51 of the coil spring 5 to the catch portion 31, and the first cam portion 41 and the second cam portion 42 both formed on the pivot portion 47 of the shaft member 4, and the first cam portion 41 and the second cam portion 42 operate the spring brake mechanism including the coil spring 5. When the framework 2 turns and reaches the one end of the operation range, the catch portion 31 catches the free end 51 of the coil spring 5 by the first cam portion 41 and the auxiliary cam portion 32. When the framework 2 turns and reaches the other end of the operation range, the second cam portion 42 releases the free end 51 from the catch portion 31. The catch portion 31 catches the free end 51 with the tightening by the coil 50 of the coil spring 5 being decreased, and thus the framework 2 of the headrest 1 can be moved backwardly.

According to the headrest 1, the framework 2 and the bracket 3 turn relative to the stay 6 around the opening 27. Since the opening 27 becomes the turning axis, the opening 27 can be downsized. According to the first embodiment, a good-designed, downsized, and lightweight headrest 1 that has the opening 27 not so prominent can be provided.

According to the headrest 1, the pivot portion 47 of the shaft member 4 is located between the opening 27 of the framework 2 and the first pillar portion 61 of the stay 6. In comparison with a case in which the pivot portion 47 of the shaft member 4 is located above the first pillar portion 61 of the stay 6, a design constraint is little.

The headrest 1 includes the bent portions 55 and 56 at the free end 51 of coil spring 5. Hence, even with the free end 51 of the coil spring 5 being loosely inserted in the spring insertion hole 39, the bent portions 55 and 56 elastically deform, allowing the coil 50 of the coil spring 5 to move freely in the axial direction. In addition, the position of the free end 51 of the coil spring 5 can be adjusted by forming the plurality of spring insertion grooves, such as the spring insertion grooves 39 and 390. When, for example, the free end 51 is formed so as to have a sufficient length to function as the free end, and a plurality of spring insertion grooves is formed instead of the spring insertion groove 39, the tightening torque by the coil spring 5 can be finely adjusted using the replacement spring insertion groove. Hence, tightening force of the pivot portion 47 of the shaft member 4 by the coil spring 5 can be adjusted.

Second Embodiment

Figure 6A:
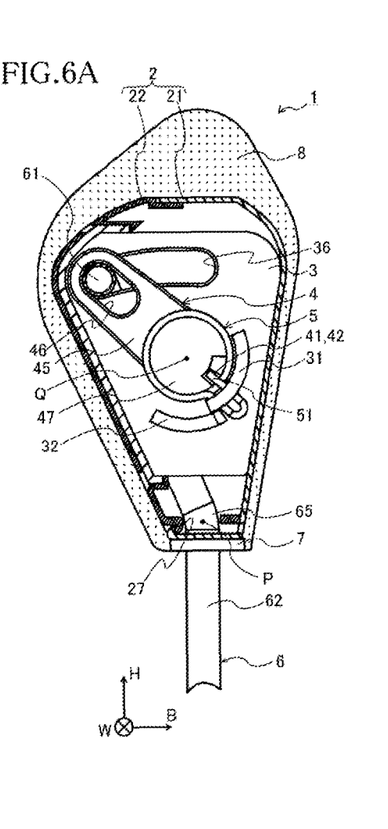
FIGS. 6A-6C are cross-sectional views illustrating headrests according to second to fourth embodiments of the present disclosure.

As illustrated in FIG. 6A, a headrest 1 according to a second embodiment has the free end 51 of the coil spring 5 bent in a U shape. That is, the free end 51 is once bent outwardly relative to the coil 50, and then bent toward the center direction of the coil 50. In addition, according to this headrest 1, the first cam portion 41 and the second cam portion 42 are formed at the internal side of the outer circumference of the pivot portion 47 and at the end thereof. The end of the free end 51 is located at the side face of the first cam portion 41 and that of the second cam portion 42.

According to the headrest 1 of the second embodiment, since the first cam portion 41 and the second cam portion 42 formed on the shaft member 4 are located at the internal side of the outer circumference, the headrest 1 can be downsized. For example, the headrest of this embodiment can be further downsized in comparison with the headrest 1 of the first embodiment (see FIGS. 6A-6C, note that in all of FIGS. 6A-6C, the second pillar portion 62 of the stay 6 has the same thickness). According to the headrest 1 of the present disclosure, the location and shape of the first cam portion 41, and those of the second cam portion 42 can be changed as appropriate. According to the present disclosure, like the first cam portion 41 and second cam portion 42 of the headrest 1 according to the second embodiment, the position and shape of the catch portion 31 and those of the auxiliary cam portion 32 can be changed as appropriate.

Third Embodiment

Figure 6B:
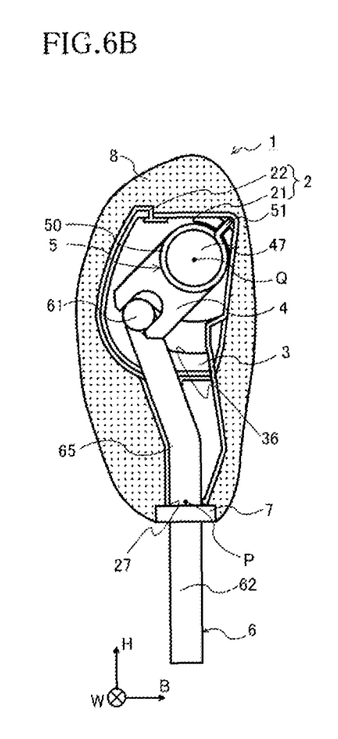

As illustrated in FIG. 6B, according to a headrest 1 of a third embodiment, the free end 51 of the coil spring 5 is formed in a straight shape. That is, the free end 51 is once bent outwardly relative to the coil 50, and then elongated straightly up to the end. In addition, according to this headrest 1, the pivot portion 47 of the shaft member 4 is disposed above the first pillar portion 61 of the stay 6.

According to the headrest 1 of the third embodiment, since the free end 51 of the coil spring 5 is simply bent outwardly, in comparison with the headrests that employ a link mechanism (see Patent Literatures 1-4), the headrest can be downsized. For example, the headrest 1 can be further downsized in comparison with the headrest 1 of the second embodiment.

Fourth Embodiment

Figure 6C:
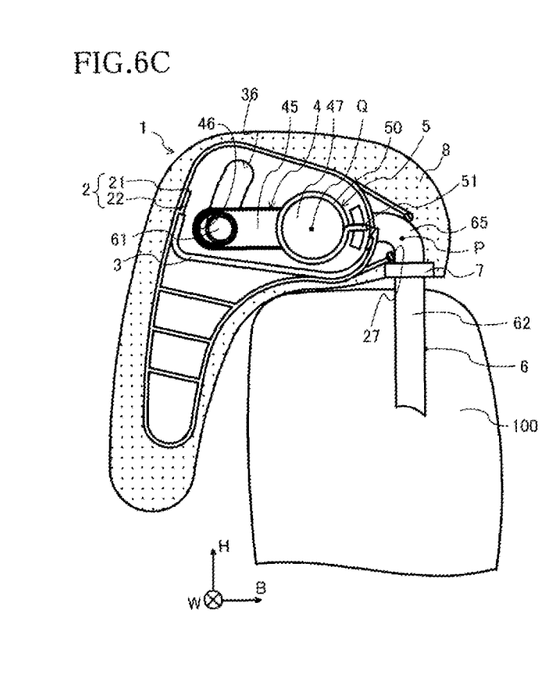

As illustrated in FIG. 6C, a headrest 1 according to a fourth embodiment is a so-called saddle-shaped headrest that is often applied for rear seats (second seat, third seat) of a vehicle. According to conventional headrests, the front surface side of the framework 2 is formed to the thickness of 30 mm or so, allowing a sitting person not to have an uncomfortable feeling when sitting down. Conversely, according to the headrest 1 of the fourth embodiment, the framework 2 is formed in a reversed L shape in the back-and-forth cross-sectional direction of the seat 100, and the front surface side is formed in a shape protruding by around 70-100 mm from the seat 100. This shape causes the sitting person to have an uncomfortable feeling when sitting down. The framework 2 is capable of turning relative to the stay 6. The second pillar portion 62 of the stay 6 is folded forwardly, and is inserted in the attachment hole of the seat 100 so as to be movable in the vertical direction. In addition, the free end 51 of the coil spring 5 is shorter than the free end 51 of the first embodiment, and is in a straight shape.

The protruding shape of the framework 2 is an uncomfortable shape for the sitting person unless the sitting person pulls up the stay 6 upwardly and moves the framework 2. That is, when the framework 2 is located at the position illustrated in FIG. 6C, the framework 2 has a shape which protrudes toward the front side of the seat 100, and which becomes an obstacle for sitting. This shape is adopted for the purpose of preventing the sitting person from not using the headrest 1 when sitting down. According to the headrest 1 of the fourth embodiment, when the sitting person is sitting down (when there is a sitting person), the second pillar portion 62 of the stay 6 is moved upwardly from the position illustrated in FIG. 6C, and the framework 2 is moved to a position so as not to disturb the sitting person. The framework 2 is moved up to the height of the head of the sitting person, and the position between the framework 2 and the head of the sitting person is adjusted at this position. Conversely, when there is no sitting person, the second pillar portion 62 of the stay 6 is returned to the position illustrated in FIG. 6C. Hence, an accident at the rear seat due to the unused headrest 1 is avoided, and a safe driving is ensured so as not to disturb the eyesight of the driver. This embodiment is a specific example that enables downsizing by the application of a spring brake. Like the first embodiment, the headrest 1 allows the framework 2 to turn relative to the stay 6, thus capable of precisely adjusting the distance between the head of the sitting person and the framework 2 in a stepless manner. Hence, this headrest 1 is most suitable for the protection of the head of the sitting person.

Although the embodiments of the present disclosure have been explained above, the present disclosure is not limited to the above embodiments. For example, in the above first embodiment, the elongated diameter of the first stay insertion groove 36 of the bracket 3 runs in the back-and-forth direction, but this elongated diameter may be formed so as to run in the vertical direction (see FIG. 6A). In addition, the first stay insertion groove 36 may be formed in a downward linear sloping shape to the right side. According to the present disclosure, as long as the first stay insertion groove 36 guides the framework 2 in a turnable manner toward the head of the sitting person, the direction of the first stay insertion groove 36 is not limited to any particular direction.

According to the present disclosure, the center position of the circular arc of the first stay insertion groove 36 is not limited to the above embodiments. According to the present disclosure, in addition to the shape of the first stay insertion groove 36, by changing the direction of the center of the circular arc of the first stay insertion groove 36, the turning direction of the framework 2 and the adjustment range of the framework 2 can be changed. For example, the framework 2 may be rotatable forward and upward by disposing the circular arc center of the first stay insertion groove 36 at the forward side. Moreover, by disposing the circular arc center at the opposite side, the framework 2 may be rotatable forward and downward.

In addition, according to the above embodiments, the first stay insertion groove 36 of the bracket 3 is a groove. According to the present disclosure, the first stay insertion groove 36 can have a bottom or be bottomless. Moreover, the first stay insertion groove 36 may be formed in other member than the bracket 3 as long as the first stay insertion groove 36 functions as a guide for the first pillar portion 61 of the stay 6. For example, a groove like a rib may be formed inside the framework 2, and may be utilized as the first stay insertion groove 36.

The second stay insertion groove 46 of the shaft member 4 is not limited to a groove or a through hole as long as the second stay insertion groove 46 does not interfere with the interaction of the first pillar portion 61 of the stay 6 and the first stay insertion groove 36. For example, the second stay insertion groove 46 may be a U-shaped groove (see FIG. 6B).

According to the present disclosure, the structure in which the free end 51 includes the bent portions 55 and 56 is an arbitrary structure. As for the spring brake by the coil spring 5, the tightening torque in the initial condition, and the locking torque are defined by the coil diameter of the coil spring 5, the wire diameter, the number of windings and a difference (for example, 3%) of the coil internal diameter relative to the shaft diameter. The bent portions 55 and 56 are formed to adjust the above torques in addition to those factors. Hence, as long as desired torque is applicable to the coil spring 5, like the coil springs 5 of the third and fourth embodiments, the free end 51 may have no bent portion 55 and 56.

In the above embodiments, the bent portions 55 and 56 of the coil spring 5 form an S shape as a whole, but according to the present disclosure, others are optional as long as the free end 51 of the coil spring 5 includes the bent portion and is elastically deformable. For example, the free end 51 may be formed in a U shape, C shape, circular shape, or coil shape.

According to the above embodiments, the framework 2 and the bracket 3 are separate components. In addition, the pipe of the stay 6 is bent to form the first pillar portion 61 and the second pillar portion 62. According to the present disclosure, however, those components may be separate structures or an integral structure.

According to the present disclosure, the shape of the stay 6 in the above embodiments is not limited to any particular shape. For example, the stay 6 may include a plurality of the first pillar portions 61. In addition, the first pillar portion 61 and the second pillar portion 62 may be elongated in directions other than the horizontal direction and the vertical direction. For example, the first pillar portion 61 may be elongated in the horizontal direction, and may be curved upwardly or downwardly in the halfway location.

According to the above embodiments, a configuration in which the framework 2 turns around the bent portion 65 of the stay 6 located below, in other words, the headrest 1 is a so-called upward swing type, but the present disclosure is not limited to this configuration. For example, the framework 2 may turn around the upper end portion of the first pillar portion 61 of the stay 6 (the headrest 1 may be a so-called downward swing type).

In the above embodiments, the stay 6 is directly held by the bracket 3, but a parallel link mechanism may be linked with the stay 6, and the shaft member 4 may be movable in the parallel direction relative to the stay 6.

In the above embodiments, the explanation has been given of a configuration in which the headrest 1 includes the sealing member 7 and the cushioning member 8, but according to the present disclosure, the headrest 1 is not matter whether including such members.

In the above embodiments, a case in which the first pillar portion 61 of the stay 6 is located at the front end portion of the first stay insertion groove 36 of the bracket 3 is referred to as the initial condition, but the name for the initial condition is merely given for the convenience of explaining the embodiments. The present disclosure also covers a case in which the first pillar portion 61 is located at a position other than the front end portion of the first stay insertion groove 36 of the bracket 3.

The foregoing describes some example embodiments for explanatory purposes. Although the foregoing discussion has presented specific embodiments, persons skilled in the art will recognize that changes may be made in form and detail without departing from the broader spirit and scope of the invention.

INDUSTRIAL APPLICABILITY

The present disclosure is applicable to an application of adjusting the position relative to the head of the sitting person on a vehicular seat, a sofa bed, and the like.

REFERENCE SIGNS LIST

1 Headrest
2 Framework
3 Bracket
4 Shaft member
5 Coil spring
6 Stay
7 Sealing member
8 Cushioning member
21 Framework rear portion
22 Framework front portion
25 Rib
26 Support portion
27 Opening
31 Catch portion
32 Auxiliary cam portion
34 Spring insertion hole
35 Plate portion
36 First stay insertion groove
37 Spring catch portion
38 Through hole
39, 390 Spring insertion groove
41 First cam portion
42 Second cam portion
45 Arm portion
46 Second stay insertion groove
47 Pivot portion
48 Front end portion
50 Coil
51 Free end
52 Fixed end
55, 56 Bent portion
61 First pillar portion (coupling portion)
62 Second pillar portion (pillar body)
65 Bent portion
100 Seat
M, L Distance
P, Q Center
S, R Angle
r1, r2 Arrow

The invention claimed is:

1. A headrest that supports a head of a sitting person, the headrest comprising:
a stay comprising two pillar bodies and a coupling member that couples the two pillar bodies;
a framework including a first stay groove into which the coupling member is inserted and extending toward the head of the sitting person, the framework including an opening formed at a position located away from the first stay groove by a distance M and the framework being turnable in an angle range up to an angle R enclosed by a line emanating from a center P of the opening to one end of the first stay groove and a line emanating from the center P of the opening to the other end of the first stay groove;
a shaft member including a shaft portion and an arm portion, the arm portion abutting on the coupling member at a position located away from a center Q of the shaft portion by a distance L and the arm portion including a second stay groove extending toward the center Q; and
a coil spring including a coil an internal diameter of which is smaller than the shaft member in a free condition of the coil, the coil being wound around the shaft portion and one end of the coil is stationary fixed to the framework, wherein
the distance L from the shaft portion is shorter than the distance M in the framework,
the shaft portion is supported by the framework at a position in the angle range up to the angle R enclosed by a line emanating from the center P of the opening to one end of the first stay groove and a line emanating from the center P of the opening to the other end of the first stay groove, the shaft member turns around the shaft portion at an angle S larger than the angle R when the framework turns around the center P of the opening by the angle R, and the coil spring decreases tightening of the shaft member when the framework turns toward the head side of the sitting person and restricts the turning of the framework by tightening the shaft member to restrict the turning of the shaft member when the framework turns to the opposite side to the head side of the sitting person.

2. The headrest according to claim 1, wherein the shaft member turns in an opposite direction to the turning of the framework.

3. The headrest according to claim 1, wherein an other end of the coil comprises a bent portion.

4. A headrest that supports a head of a sitting person, the headrest comprising:
- a stay;
- a framework supported by the stay in a turnable manner toward the head of the sitting person, and supporting the head of the sitting person;
- a shaft member to be actuated in conjunction with a turning of the framework, and turning at a larger angle than a turning angle of the framework;
- a coil spring comprising a coil that is wound around the shaft member in a direction tightening the shaft member when the framework turns to an opposite side to the head side of the sitting person, having one end of the coil stationary fixed to the framework, decreasing the tightening of the shaft member when the framework turns toward the head of the sitting person, and restricting the turning of the framework by tightening the shaft member to restrict the turning thereof when the framework turns to the opposite side to the head side of the sitting person;
- first and second cam portions provided at the shaft member, turnable together with the shaft member, and capable of abutting an other end of the coil; and a catch portion provided on the framework and capable of catching the other end of the coil, wherein:
- the first cam portion abuts to the other end of the coil, and causes the other end of the coil to be caught by the catch portion when the framework turns toward the head of the sitting person, and the framework turns up to a certain position in the direction toward the head of the sitting person; and
- the second cam portion abuts to the other end of the coil, and releases the other end of the coil from the catch portion when the framework turns in the opposite direction to the head of the sitting person and the framework turns up to the certain position.

* * * * *